United States Patent Office 3,346,537
Patented Oct. 10, 1967

3,346,537
POLYOXYMETHYLENE COMPOSITIONS
Vivien Griffiths, Welwyn Garden City, and John Carswell McGowan, Harpenden, England, assignors to Imperial Chemical Industries Limited, London, England, a corporation of Great Britain
No Drawing. Filed Mar. 9, 1964, Ser. No. 350,521
Claims priority, application Great Britain, Nov. 16, 1961, 41,039/61; Jan. 30, 1962, 3,474/62
13 Claims. (Cl. 260—45.85)

This invention relates to oxymethylene polymer compositions having improved stability to oxidative fission at elevated temperatures and is a continuation-in-part of U.S. Serial No. 236,719, filed on Nov. 9, 1962.

The term "oxymethylene polymer" as used herein is generally understood by polymer chemists to include homopolymers of formaldehyde, for example as described in the specification of British Patents Nos. 748,836 and 751,299, homopolymers derived from the low polymers of formaldehyde such as trioxane and copolymers of formaldehyde (or its low polymers) with other materials. The polymers as formed are generally terminated by a hydroxyl group at least at one end of the polymeric chain and sometimes at both (when the products may be termed oxymethylene polymer glycols). These hydroxyl-ended polymers are unstable to heat and depolymerisation occurs even at temperatures of below 100° C. and generally becomes noticeable at about 130° C. This depolymerisation is generally believed to start from the ends of the polymer chain and to continue along the chain by what may be termed an "unzipping" action. A homopolymer is ultimately completely decomposed. This unzipping may be prevented to a large extent by replacing the vulnerable hydroxyl end-groups of the chains by end-groups which are more stable, for instance carboxylate, ether or urethane end-groups. These may be formed by reacting the hydroxyl-ended polymers with, for example, acid anhydrides, alcohols, acetals, ethers, isocyanates or epoxides or by forming the polymer in the presence of a compound, such as an acid anhydride, formal or acetal, that will both act as a chain transfer agent and leave suitable groups terminating the polymer chains.

The homopolymers of the kind described, whether terminated by hydroxyl groups or more stable end-groups, are also subject to a further kind of degradation at elevated temperatures which is known as autoxidative fission. In this reaction, one or more of the oxygen-carbon linkages of the polymer chains is/are ruptured and depolymerisation then occurs from the point of rupture. Degradation by autoxidative fission generally becomes noticeable after a short period of time at temperatures above about 160° C. in oxygen or after longer periods of time at lower temperatures. Such conditions may be encountered for instance during processing of the polymer or in applications where its good dimensional stability at elevated temperatures is utilised.

The degradation effect of autoxidative fission may be reduced to some extent by incorporating in the polymer chain units which are more resistant to depolymerisation than oxymethylene units so that if chain scission occurs, depolymerisation occurs from the two ends only until the first foreign unit in the chain is met.

To this end, it has been proposed to incorporate units from a wide variety of comonomers into the oxymethylene polymer chains. Examples of comonomers proposed for addition to the polymerisation of trioxane or formaldehyde are (1) oxacyclic compounds such as epoxides, cyclic ethers, cyclic formals, acetals and ketals, cyclic carboxylic acid anhydrides, cyclic carbonates and lactones, (2) ethylenically unsaturated compounds such as styrene, (3) preformed polymers such as polyformals, polyglycols, polythiols and polysiloxanes and certain polymers derived from ethylenically unsaturated compounds.

While the degradation of oxymethylene polymers caused by autoxidative fission may be reduced to some extent by incorporating into the polymer chain foreign units having greater resistance to depolymerisation than oxymethylene units, we have found that this form of degradation may still occur to an undesirable extent, for instance during polymer processing operations, and it is an object of this invention to provide oxymethylene polymer compositions having a reduced tendency to autoxidative fission.

It has been proposed as described in U.S. Patent 3,046,249 to add various stabilisers to oxymethylene polymers including hydrazine, amines, phenols, urea and certain hydroxyl substituted anthraquinones. The usefulness of such stabilisers has been limited and a need has existed for stabilisers of increased efficiency.

According to the present invention, we provide a new polymeric composition having unexpectedly increased resistance to autoxidative fission comprising 100 parts of an oxymethylene polymer and at least 0.05 part of a quinone in which at least one of the neclearly bound hydrogen atoms has been replaced by an anilino group or a nitro group. A mixture of these quinones may be used if desired.

The invention is applicable to all oxymethylene polymers, whether liquid or solid, since they all tend to be prone to autoxidative fission. However, it is particularly adaptable to the oxymethylene polymers having inherent viscosities in the range of from about 0.5 to about 4, which are the most generally useful.

In particular, the term oxymethylene polymers as employed herein includes the homopolymers of formaldehyde, as described above and copolymers with a wide variety of comonomers. The copolymers may be for example those described in the copending applications of Gibb, Ser. No. 241,470 filed Dec. 3, 1962; Buckley, Ser. No. 248,266 filed Dec. 31, 1962; Small, Ser. No. 243,625 filed Dec. 10, 1962; Small, Ser. No. 243,626 filed Dec. 10, 1962; Jennings, Ser. No. 243,623 filed Dec. 10, 1962, and Jennings, Ser. No. 244,021 filed Dec. 12, 1962, the disclosures of which are hereby incorporated by reference. Other suitable oxymethylene polymers to which the invention may be applied are described in British Patent No. 557,873, British Patent No. 807,589, British Patent No. 809,754, British Patent No. 885,572, British Patent No. 902,602, British Patent No. 903,668, Belgian Patent No. 602,805, Belgian Patent No. 605,471, Belgian Patent No. 610,580, French Patent No. 1,271,297, French Patent No. 1,272,971, French Patent No. 1,275,561, French Patent No. 1,302,995, Angewandte Chemie, vol. 73, No. 6, the disclosures of which are hereby incorported by reference.

Suitable copolymers include those derived by adding, to the polymerisation of trioxane or formaldehyde, the comonomers described above, namely, (1) oxacyclic compounds such as epoxides, cyclic ethers, cyclic formals, acetals and ketals, cyclic carboxylic acid anhydrides, cyclic carbonates and lactones, said oxacyclic compounds being both unsubstituted and substituted with aliphatic, aromatic, halogen, oxygen, sulphur and other groups, for instance ethylene oxide, propylene-1,2-oxide, butylene-1, 2-oxide, styrene oxide, butadiene monoxide, trimethylene oxide, tetramethylene oxide, pentamethylene oxide, 2,2-(di-chloromethyl)-1,3-propylene oxide, butylene-1,3-oxide, 1,3-dioxolane, 1,3-dioxane, 4-phenyl-1,3-dioxane, 1,3-dioxacycloheptane, 1,3,5 - trioxepane, 1,3 - dioxacycloheptene-5 (1,3-dioxep-5-ene), 2-isopropyl-1, 3 -dioxep-5-ene, the cyclic formal of o-xylylene glycol, the cyclic formal of di($\beta$-hydroxyethyl) sulphone, the cyclic formal of di($\beta$-hydroxyethyl) sulphide, cyclic adipic anhydride, cyclic ethylene glycol carbonate, $\beta$-propiolactone, and $\gamma$-butyrolactone. (2) ethylenically unsaturated compounds having one or more $>C=C<$ groups in which the free valences are satisfied with alkyl, aryl, carbonyl, halogen, amino, ether, ester and other groups such as styrene, $\alpha$-methyl styrene, 1,1-diphenyl ethylene, isobutene, indene, vinyl alkyl ethers, vinyl acetate, vinyl methyl ketone, coumarone, acrolein, methacrolein dimer, methyl acrylate, acrylonitrile, N-vinyl amines, N-vinyl amides, glycidyl ethers and divinyl benzene, (3) preformed polymers such as polyformals, polyglycols, polythiols and polysiloxanes and polymers derived from ethylenically unsaturated compounds which contain groups reactive with formaldehyde or other source of oxymethylene repeating units of the oxymethylene polymers, for instance poly(ethylene glycol formal), poly(hexamethylene glycol formal), poly(decamethylene glycol formal), poly(but-2-ene-1,4-diol formal), poly(p-xylylene glycol formal), polyethylene and polybutylene glycols, polybutylene thiols, poly(dimethyl siloxane), reduced ethylene/carbon monoxide copolymers, reductively aminated ethylene/carbon monoxide copolymers, vinyl acetate/acrylic acid copolymers, methyl acrylate/vinyl-oxypropylamine copolymers, reduced butadiene/acrylonitrile copolymers and reduced styrene/cyanoethyl acrylate copolymers.

It will be appreciated that the incorporation of units from these comonomers into oxymethylene polymer chains may not only reduce the undesirable effect of autoxidative fission but may also modify other properties of the polymer. Other comonomers which have also been proposed to modify the polymer include carbonyl compounds such as acetaldehyde, isobutyraldehyde, perfluoroacetaldehyde, chloral, n-octanoyl-n-hexyl ketene and isocyanic acid.

The addition of large amounts of comonomer into the polymer chain may modify the polymer to such an extent that the characteristic properties of an oxymethylene polymer, such as high melting point, high modulus, inertness to a wide variety of chemicals, and toughness, are no longer apparent. Thus, it is preferred to add only small amounts of comonomer into the polymer chain, so that in general at least 85 for every 100 units in the polymer chain are oxymethylene (—$OCH_2$—) units. The preferred polymers normally contain 95 or more oxymethylene units for every 100 units in the chain.

Thus the term oxyethylene polymer as used herein is to be understood to include homopolyoxymethylenes, for example as derived from the homopolymerisation of formaldehyde or trioxane, and oxymethylene copolymers in which at least 85 units for every 100 units in the polymer chain are oxymethylene units. The term is also to be understood to include all homopolymers and copolymers as defined above whether terminated by hydroxyl groups or by other groups such as ether, ester or urethane groups. The generally preferred oxymethylene polymers are those derived from the copolymerisation of trioxane with oxyacyclic compounds containing at least two adjacent carbon atoms in the ring, particularly epoxides, lactones and cyclic formals, acetals and ketals.

By "quinone" we mean a dioxo derivative of a dihydroaromatic compound in which the oxygen atoms occupy positions ortho or para (or their equivalents in polycyclic compounds) to each other and have a conjugated double bond system in which oxo $C=O$ group is conjugated with the oxo $C=O$ group or with a $C=C$ group of an aromatic ring. Examples of such compounds are 1,2-benzoquinone, 1,4-benzoquinone, 1,2-naphthoquinone, 1,4-naphthoquinone, quinoline-5,8-quinone, anthraquinone, phenanthraquinone, 1,2-chrysene quinone, naphthacene quinone, pyrene quinone, indene quinone, diphenoquinone, 4,4'-stilbene quinone, diphenyl-diquinone and spirobis-(indan)-tetrone.

By a nuclearly bound hydrogen atom, we mean a hydrogen atom attached to a carbon atom which is part of a ring structure of the quinone. In our specified substituted quinones, at least one of the nuclearly bound hydrogen atoms of the quinone has been replaced by an anilino ($C_6H_5NH$—) or nitro (—$NO_2$) group. The remaining nuclearly bound hydrogen atoms in the quinone may be substituted by other monovalent atoms or groups if desired and we include such substituted compounds within the term quinone. Examples of common substituents are halogen atoms, e.g. chlorine, fluorine and bromine, and groups having the structure —R, —OH, —OR, —SR, —$NH_2$, —NHR, —NRR', —COOH, —COOR, —CONHR and —NHCOR where R and R' are each monovalent hydrocarbon radicals containing up to eight carbon atoms, e.g. methyl, ethyl, propyl, amyl, hexyl or octyl, or their derivatives substituted with halogen such as bromine, chlorine or fluorine, e.g. 4-chlorobutyl, 2-bromoamyl, etc., and may be the same or different. One or more of the aromatically bound hydrogen atoms of the anilino group may also be replaced by a halogen atom, e.g. fluorine, bromine and chlorine, an hydroxyl group or a monovalent hydrocarbon radical containing up to 4 carbon atoms, e.g. methyl, ethyl, propyl, isopropyl, butyl, isobutyl or t-butyl, if desired.

Examples of our nitro- and anilino-quinones are 2,5-dianilino-p-benzoquinone;
2,3-dianilino-p-benzoquinone;
2,3,5-trianilino-p-benzoquinone;
2,5-dianilino-3,6-dichloro-p-benzoquinone;
2,5-bis(p-hydroxy-anilino)p-benzoquinone;
2,5-diacetamido-3,6-dianilino-p-benzoquinone;
3,5-dinitro-o-benzoquinone;
4,5-dinitro-o-benzoquinone;
2,5-dihydroxy-3,6-dinitro-p-benzoquinone;
4-anilino-1,2-naphthoquinone;
2-anilino-1,4-naphthoquinone;
2-anilino-3-methyl-1,4-naphthoquinone;
2-chloro-3-anilino-1,4-naphthoquinone;
2-methyl-3-nitro-1,4-naphthoquinone;
2-anilino-anthraquinone;
1,2-dihydroxy-5,8-di-(p-methylanilino) anthraquinone;
1,5-dihydroxy-4-anilino-8-nitroanthraquinone;
1-amino-4-anilino-anthraquinone;
1-amino-2-methyl-4-anilino-anthraquinone;
1 - amino - 2 - bromo-4-(2-bromo-4,6-dimethylanilino)-anthraquinone;
1-amino - 2 - bromo-4-(2-bromo-4,6-dimethylanilino)6,7-di-chloro-anthraquinone;
1-amino-4-nitro-anthraquinone;
1-amino-5-nitro-anthraquinone;
1-amino-8-nitro-anthraquinone;
1-anilino-4-chloro-anthraquinone;
1-anilino-4-(2,4-dimethylanilino)-anthraquinone;
1-anilino-4-p-hydroxyanilinoanthraquinone;
1-benzamido-5-nitro-anthraquinone;
1-p-butylanilino-anthraquinone;
1-nitro-2-butyl-anthraquinone;
1,5-diamino-4,8-dinitro-anthraquinone;
1,8-diamino-4,5-dinitro-anthraquinone;
1,4 - dianilino-2,3-dichloro-5,8-dimethoxy-anthraquinone;
5,8-dianilino-1,2,3,4-tetrachloro-anthraquinone;
1-nitro-2,3-dimethoxy-anthraquinone;
1,5-dinitro-2,6-dimethyl anthraquinone;
1,5-dinitro-anthraquinone;
1,8-dinitro-anthraquinone;

2,7-dinitro-anthraquinone;
1,5-dihydroxy-4,8-dinitro-anthraquinone;
benzyl-1-nitro-anthraquinone-2-carboxylate;
1,3-dinitro-2-hydroxy-4-methyl-anthraquinone;
1-hydroxy-4-methyl-5-nitro-anthraquinone;
1-nitro-2-methyl-anthraquinone;
2-methyl-1,5-dinitro-anthraquinone;
2-methyl-1,8-dinitro-anthraquinone;
1-nitro-anthraquinone;
2-nitro-anthraquinone;
anilino-5,6-chrysenequinone;
dinitro-5,6-chrysenequinone;
12-nitro-5,6-chrysenequinone;
tetra-nitro-5,6-chrysenequinone;
4-nitro-phenanthraquinone;
2,3-dinitro-phenanthraquinone;
2,4-dinitro-phenanthraquinone and
2,7-dinitro-phenanthraquinone.

We have found that the effectiveness of our substituted quinones may depend upon the positions of the nitro or anilino groups in relation to the oxo (C=O) groups, the number of nitro and/or anilino groups in the compound and the nature and position of other substituents in the compounds. In general, we have found that increase in the number of nitro and/or anilino groups in the molecule increases the effectiveness of the quinone as a stabiliser and at least in the case of the nitro derivatives of quinones derived from polynuclear hydrocarbons, we have found that the efficiency of the compounds may be greater if the nitro group is in the α-position relative to the quinonoid structure.

In general, we have found that while the substitution of other nuclearly bound hydrogen atoms of our nitro- and anilino-quinones may affect their efficiency as stabilisers the effect is minor compared with the very enhanced effect of the anilino or nitro groups. Substitution of the aromatically bound hydrogen atoms of the anilino group, however, tends to reduce the effectiveness of the quinone.

Most of our anilino- and nitro-quinones are coloured to some extent but some are highly coloured and it may be preferred to use these only in pigmented compositions. In these cases, they may be used as the colorants themselves.

The top limit of the amount of quinone that may be used in our compositions is limited only by economic considerations and for this reason will not normally exceed 5% by weight of the oxymethylene polymer. It is preferred to use between 0.05 and 1% for most applications.

The compositions may be formed by any convenient method in which intimate mixing is effected. For example, the solid polymer may be compounded with the quinone or may be dissolved and the quinone dispersed or dissolved in the solution. Suitable solvents include p-chlorophenol, benzyl alcohol and dimethyl formamide. The polymer may also be melted in vacuo or under an atmosphere of inert gas and the quinone thoroughly stirred into the melt.

Other common additives such as pigments, fillers (e.g. fibrous glass), plasticisers, mould-release agents, lubricants, ultra-violet light screening agents and other stabilisers (such as phenols, ureas, thioureas, hydrazines, hydrazides and the like) may be added to our compositions and the compositions may be moulded, cast into films and sheets or spun into fibres.

Our invention is illustrated by the following examples in which all parts are expressed as parts by weight:

In each of the following examples, a sample was prepared by milling 100 parts of a copolymer comprising 98.5 mole percent of oxymethylene units and 1.5 mole percent of oxyethylene units with 0.5 part of the selected quinone at 165–170° C. The compositions were pressed at 170° C. into sheets of about 0.020 inch thickness.

Sections measuring about 1.0 x 1.0 inch obtained from these sheets were placed in a circulating oven at 140° C. and the times were recorded at which the samples first become brittle, as measured by a manual flex test.

Examples 1 to 8 demonstrate the effect of anilino-benzoquinones compared with the quinones from which they were derived and the same quinones carrying substituents other than anilino or nitro groups.

| Example | Additive | Time to embrittlement (hours) |
|---|---|---|
| Test | Nil | <4 |
| 1 | p-Benzoquinone | 56 |
| 2 | 2,5-dianilino-p-benzoquinone | 1,390 |
| 3 | 2,5-dianilino-3,6-dichloro-p-benzoquinone | 1,010 |
| 4 | 2,5-di-t-butyl-p-benzoquinone | 50 |
| 5 | 3,5-di-t-butyl-o-benzoquinone | 50 |
| 6 | 2,6-di-t-butyl-p-benzoquinone | 215 |
| 7 | 2,5-dimorpholino-p-benzoquinone | 190 |
| 8 | 4,5-dimorpholino-o-benzoquinone | 380 |

Comparison of Example 1 with Examples 2 and 3 shows that while p-benzoquinone itself has some stabilising effect, the anilino-benzoquinones are markedly superior, increasing the life of the specimen by some twenty times. Comparison of Example 2 with Example 7 will show that the effect is not merely due to the increased molecular weight of the quinone. The molecular weight of 2,5-dianilino-p-benzoquinone is 290 (compared with 110 for benzoquinone) and the molecular weight of 2,5-dimorpholino-p-benzoquinones is 278 yet the polymer composition containing the former compound has about seven times the life of the composition of Example 7.

The following examples demonstrate the surprisingly good stabilising effect of anilino-anthraquinones compared with anthraquinone itself and other substituted derivatives thereof.

| Example | Additive | Time to embrittlement (hours) |
|---|---|---|
| Test | Nil | <4 |
| 9 | Anthraquinone | 65 |
| 10 | 2-anilino-anthraquinone | 1,055 |
| 11 | 2-amino-anthraquinone | 40 |
| 12 | 1,2-dihydroxy-anthraquinone | 265 |
| 13 | 1,2-dihydroxy-5,8-di(p-methylanilino) anthraquinone | 765 |
| 14 | 1,4-dihydroxy-anthraquinone | 240 |
| 15 | 1,2,5,8-tetrahydroxy-anthraquinone | 215 |

In this case, as in the case of the benzoquinone compounds, the remarkable effect of an anilino-substituted anthraquinone may be observed by comparing the results of Examples 9 and 10. Comparison of Examples 10 and 11 show that this effect is not shared by anthraquinones substituted with amine groups. In fact, 2-amino-anthraquinone is not as good in its effect as anthraquinone itself. Comparison of Examples 12 and 13 again shows the improvement gained by using an anilino-quinone. Examples 12, 14 and 15 show that while hydroxy-anthraquinones have some stabilising effect and are in fact better than the parent compound, they cannot compare with our stablisers. Increasing the number of hydroxyl groups on the quinone in fact appears to decrease the effectiveness of the compounds as stabilisers.

Examples 16 to 23 show the effect of nitro substituents on the efficiency of quinones as stabilisers.

| Example | Additive | Time to embrittlement (hours) |
|---|---|---|
| Test | Nil | <4 |
| 16 | Anthraquinone | 65 |
| 17 | 1,8-dinitro-anthraquinone | 336 |
| 18 | 2,7-dinitro-anthraquinone | 864 |
| 19 | 1,5-dihydroxy-anthraquinone | 95 |
| 20 | 1,5-dihydroxy-4,8-dinitro-anthraquinone | 1,225 |
| 21 | Phenanthraquinone | 100 |
| 22 | 4-nitrophenanthraquinone | 360 |
| 23 | 2,7-dinitrophenanthraquinone | 528 |

Comparison of Example 16 with Examples 17 and 18, of Example 19 with Example 20 and of Example 21 with Examples 22 and 23 clearly shows the effect achieved by the use of nitro-substituted quinones. Comparison of Example 17 with Example 18 also illustrates the effect of having the substituents in the α position to the quinone structure, while comparison of Example 23 with Example 22 shows the effect of increasing the number of nitro groups.

*Example 24*

The stabiliser of Example 20 was replaced by 0.5 part of 1,5-dihydroxy-4-anilino-8-nitroanthraquinone and the sample was found to have a life of 1960 hours before embrittlement. Direct comparison of this example with Example 20 demonstrates the very marked effect of replacing a nitro group by an anilino group on the efficiency of the compound as a stabiliser. The life of the sample is increased by over 700 hours.

*Example 25*

100 parts of a copolymer comprising 98.5 mole percent of oxymethylene units and 1.5 mole percent of oxyethylene units were milled with 0.5 part of benzyl-1-nitroanthraquinone-2-carboxylate in the manner described hereinbefore. A sheet 1 inch by 1 inch by 0.020 inch thick was formed from the composition by pressing it at 170° C. and cutting out a square from the pressing. The sample was placed in a circulating oven at 140° C. and tested for brittleness at regular intervals. It did not embrittle until after 815 hours had elapsed.

*Example 26*

If the polymer of Example 17 is replaced by a copolymer with 98.9 mole percent of oxymethylene units derived from the polymerisation of trioxane with 1,3-dioxep-5-ene, a copolymer of 100 parts of trioxane and 5 parts of β-propiolactone, a copolymer containing 95 mole percent of oxymethylene units derived from the polymerisation of trioxane with the cyclic formal of o-xylylene glycol, a polymer containing 95 mole percent of oxymethylene units derived from the copolymerisation of trioxane with poly(p-xylylene glycol formal) having a molecular weight of 3000, a copolymer of 100 parts of trioxane and 4 parts of neopentyl formal, a copolymer containing 95 mole percent of oxymethylene units derived from the copolymerisation of trioxane with the cyclic formal of dihydroxyethyl sulphone, a copolymer containing 98 mole percent of oxymethylene units derived from the copolymerisation of trioxane with indene, a copolymer of 100 parts of trioxane and 5 parts of vinyl isobutyl ether, a copolymer containing 94.5 mole percent of oxymethylene units derived from the copolymerisation of trioxane with methacrolein dimer, a copolymer of 91 mole percent formaldehyde and 9 mole percent methyl methacrylate/vinyloxyethylamine copolymer or a copolymer of 95 mole percent formaldehyde and 5 mole percent isobutyl oxide, similar improvements in stability will be obtained in each case over the unstabilised polymer and the polymer stabilised with 0.5 part of anthraquinone.

*Example 27*

A series of experiments were carried out in each of which 100 parts of the copolymer used in Examples 1 to 25 were milled with 0.5 part of a quinone and samples of the composition were heated in an air-circulating oven at 140° C. in the manner and under the conditions described above. The quinones tested were 1,2-naphththoquinone;
1,4-naphthoquinone;
1,2-chrysene quinone;
3-methyl-6-(3,5,5-trimethylpentyl)-p-benzoquinone;
3,3'-dimethyl-5,5'-ditertiary butyl diphenoquinone;
3,3',5,5'-tetra-t-butyl-stilbene quinone;
3,3,3',3'-tetra-methyl-1,1'-spirobis(indan)-5,5',6,6-tetrone;
phenyl-p-benzoquinone;
3,3',5,5'-tetramethyl diphenoquinone;
2-methyl-3-(2,6,10,14-tetra-methyl-hexadec-14-enyl)-1,4-naphthoquinone;
2,5-di-t-butyl-p-benzoquinone;
2,6-di-t-butyl-p-benzoquinone;
3,5-di-t-butyl-o-benzoquinone.

The time that elapsed before the compositions embrittled ranged from 50 hours in the case of the composition containing 2,5-di-t-butyl-p-benzoquinone to 265 hours in the case of the composition containing 2-methyl-3-(2,6,10,14-tetramethyl-hexadec-14-enyl)-1,4-naphthoquinone. Thus although a wide variety of quinones was tested, none would improve upon the effectiveness of our nitro- and anilino-quinones.

We claim:

1. A polymeric composition with improved stability to autoxidative degradation at elevated temperatrues comprising 100 parts of an oxymethylene polymer selected from the group consisting of homopolyoxymethylenes and oxymethylene copolymers with a copolymerizable constituent selected from the group consisting of oxacyclic compounds, ethylenically unsaturated compounds containing at least one carbon-to-carbon double bond and preformed polymers selected from the group consisting of polyformals, polyglycols, polythiols, and polysiloxanes and polymers derived from ethylenically unsaturated compounds which contain groups reactive with formaldehyde, in which at least 85 units for every 100 units in the polymer chain are oxymethylene units, and at least 0.05 part of at least one quinone selected from the group consisting of 2,5-dianilino-p-benzoquinone, 2,5-dianilino-3,6-dichloro-p-benzoquinone, 2-anilinoanthraquinone, 1,2-dihydroxy-5,8-di-(p-methylanilino)-anthraquinone, 1,5 - dihydroxy-4-anilino-8-nitroanthraquinone, 2,7-dinitroanthraquinone, 1,5-dihydroxy-4,8-dinitroanthraquinone, benzyl 1-nitroanthraquinone-2-carboxylate, 4-nitrophenanthraquinone and 2,7-dinitrophenanthraquinone.

2. A polymeric composition with improved stability to autoxidative degradation at elevated temperatures as set forth in claim 1 in which said quinone is 2,5-dianilino-p-benzoquinone.

3. A polymeric composition with imiproved stability to autoxidative degradation at elevated temperatures as set forth in claim 1 in which said quinone is 2,5-dianilino-3,6-di-chloro-p-benzoquinone.

4. A polymeric composition with improved stability to autoxidative degradation at elevated temperatures as set forth in claim 1 in which said quinone is 2-anilinoanthraquinone.

5. A polymeric composition with improved stability to autoxidative degradation at elevated temperatures as set forth in claim 1 in which said quinone is 1,5-dihydroxy-4-anilino-8-nitroanthraquinone.

6. A polymeric composition with improved stability to autoxidative degradation at elevated temperatures as set forth in claim 1 in which said quinone is 1,2-dihydroxy-5,8-di-(p-methylanilino) anthraquinone.

7. A polymeric composition with improved stability to autoxidative degradation at elevated temperatures as set forth in claim 1 in which said quinone is 2,7-dinitroanthraquinone.

8. A polymeric composition with improved stability to autoxidative degradation at elevated temperatures as set forth in claim 1 in which said quinone is 4-nitrophenanthraquinone.

9. A polymeric composition with improved stability to autoxidative degradation at elevated temperatures as set forth in claim 1 in which said quinone is 2,7-dinitrophenanthraquinone.

10. A polymeric composition with improved stability to autoxidative degradation at elevated temperatures as set forth in claim 1 in which said quinone is 1,5-dihydroxy-4,8-dinitroanthraquinone.

11. A polymeric composition with improved stability to autoxidative degradation at elevated temperatures as set forth in claim 1 in which said quinone is benzyl-1-intro-anthraquinone-2-carboxylate.

12. A polymeric composition with improved stability to autoxidative degradation at elevated temperatures as set forth in claim 1 in which for every 100 parts of said oxymethylene polymer there are from 0.05 to 5 parts of said quinone.

13. A polymeric composition with improved stability to autoxidative degradation at elevated temperatures as set forth in claim 1 in which for every 100 parts of said oxymethylene polymer there are from 0.05 to 1 part of said quinone.

References Cited

UNITED STATES PATENTS

| | | | |
|---|---|---|---|
| 2,376,354 | 5/1945 | Gresham | 260—45.9 |
| 2,960,488 | 11/1960 | Tumblyn et al. | 260—45.9 |
| 3,046,249 | 7/1962 | Hermann et al. | 260—45.9 |
| 3,079,366 | 2/1963 | Boyle et al. | 260—45.9 |
| 3,166,529 | 1/1965 | Newland et al. | 260—45.9 |

DONALD E. CZAJA, *Primary Examiner.*

LEON J. BERCOVITZ, *Examiner.*

H. E. TAYLOR, *Assistant Examiner.*